United States Patent
Stern

(10) Patent No.: US 6,227,410 B1
(45) Date of Patent: *May 8, 2001

(54) PACKAGE, METHOD FOR THE MANUFACTURE THEREOF AND COUPLING THEREFOR

(75) Inventor: Leif Einar Stern, Lomma (SE)

(73) Assignee: Asept International AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,199

(22) Filed: Apr. 21, 2000

Related U.S. Application Data

(62) Division of application No. 09/161,098, filed on Sep. 25, 1998, now Pat. No. 6,098,845.

(30) Foreign Application Priority Data

Sep. 29, 1997 (SE) .................................................. 9703498

(51) Int. Cl.⁷ ........................................................ G01F 11/00
(52) U.S. Cl. .................................. 222/1; 222/83; 222/87; 222/89
(58) Field of Search ..................................... 222/1, 81, 83, 222/83.5, 88, 89, 90, 105, 541.2

(56) References Cited

U.S. PATENT DOCUMENTS

| | | |
|---|---|---|
| 2,732,017 | 1/1956 | Fleming . |
| 3,081,911 | 3/1963 | Scholle . |
| 3,884,387 | 5/1975 | Vannucci . |
| 4,076,147 | 2/1978 | Schmit . |
| 4,314,654 | 2/1982 | Gaubert . |
| 4,337,769 | 7/1982 | Olson . |
| 4,355,737 | 10/1982 | Pongras et al. ................... 222/541.2 |
| 4,416,395 | 11/1983 | Gaubert ................... 222/83 |
| 4,484,697 | 11/1984 | Fry, Jr. . |
| 4,562,940 | 1/1986 | Asphar . |
| 4,679,705 | 7/1987 | Hamilton . |
| 4,776,488 | 10/1988 | Gurzan . |
| 5,042,690 | 8/1991 | O'Meara . |
| 5,072,762 | 12/1991 | Jimenez ................................. 222/83 |
| 5,141,133 | * 8/1992 | Ninomiya et al. ..................... 222/81 |
| 5,147,070 | * 9/1992 | Iwamoto ................................ 222/81 |
| 5,334,180 | * 8/1994 | Adolf et al. ........................... 222/81 |
| 5,407,099 | 4/1995 | Heuke et al. . |
| 5,551,606 | 9/1996 | Rai et al. . |
| 5,730,327 | 3/1998 | Stern . |
| 5,772,017 | 6/1998 | Kang ..................................... 222/83 |
| 6,082,584 | * 7/2000 | Stern ..................................... 222/81 |
| 6,098,845 | * 8/2000 | Stern ..................................... 222/81 |

FOREIGN PATENT DOCUMENTS

| | | |
|---|---|---|
| 4021743 | 1/1992 | (DE) . |
| 4115126 | 6/1992 | (DE) . |
| 0162417 | 11/1985 | (EP) . |
| 0229493 | 7/1987 | (EP) . |
| 1104359 | 2/1968 | (GB) . |
| 2179526 | 3/1987 | (GB) . |
| 81/01992 | 7/1981 | (WO) . |
| 9200895 | 1/1992 | (WO) . |

* cited by examiner

*Primary Examiner*—Joseph A. Kaufman
(74) *Attorney, Agent, or Firm*—Tarolli, Sundheim, Covell, Tummino & Szabo L.L.P.

(57) ABSTRACT

The present invention relates to a package having a flexible wall and containing liquid products. The invention also relates to a method for manufacturing the package and a coupling therefor. A perforation mechanism (6) for making a hole in the flexible wall (3) is provided not to make a hole in the wall when an inner and an outer coupling device (4, 5) are interconnected but make a hole (7) in the flexible wall (3) after the interconnection of the inner and outer coupling devices (4, 5).

3 Claims, 4 Drawing Sheets

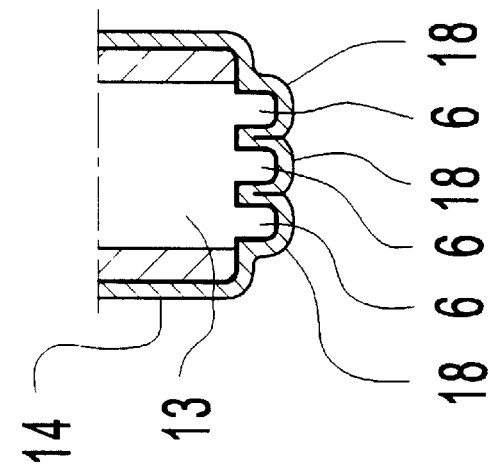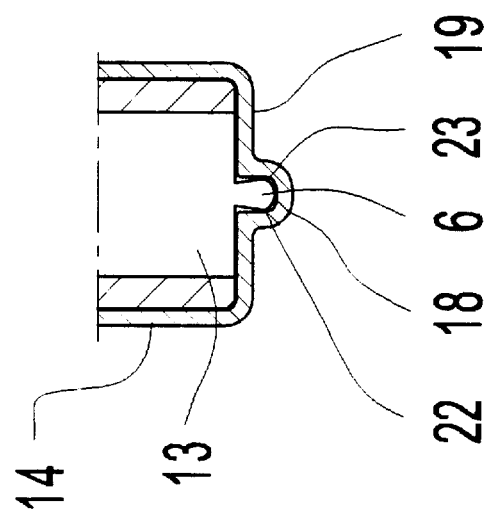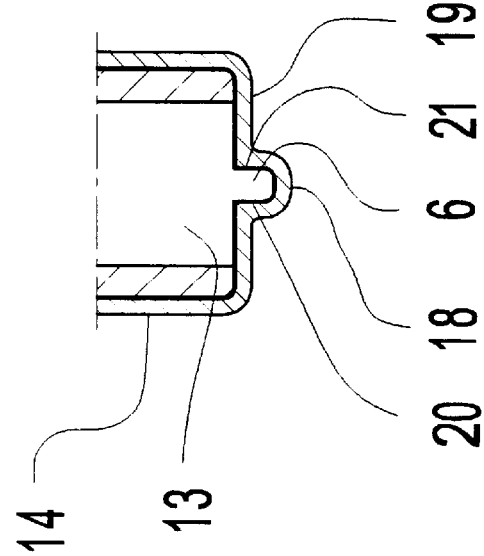

PACKAGE, METHOD FOR THE MANUFACTURE THEREOF AND COUPLING THEREFOR

This application is a divisional of application(s) application number 09/161,098 filed on Sep. 25, 1998 now U.S. Pat. No. 6,098,845.

TECHNICAL FIELD

The present invention relates to a package having a flexible wall and adapted for liquid products, preferably foodstuff in liquid form, whereby an inner coupling device is provided within unopened portions of the flexible wall, whereby the inner coupling device and an outer coupling device are connectable to each other and whereby the outer coupling device includes a perforation means for making a hole in said unopened portions of the flexible wall such that the liquid product can be discharged from the package through said hole. The invention also relates to a method for manufacturing said package and a coupling therefor.

BACKGROUND OF THE INVENTION

U.S. Pat. No. 4,603,793 relates to a package of flexible wall material and an inner as well as an outer coupling device. At this package, perforation of the flexible wall is carried through simultaneously with the interconnection of the coupling devices. This normally functions well, but leakage may occur at certain flexible wall materials during the connection/perforating step.

The object of the present invention has been to provide a package with improved opening possibilities.

The invention also includes a method for manufacturing said package and a coupling for said package.

Since no holes are made in the flexible wall of the package when the outer and inner coupling devices are connected to each other, it is seen to that no portions of the content of the package can flow or run out of the package. First when this liquid tight coupling has been established, perforation of the flexible wall of the package may occur in a simple and effective manner.

BRIEF DESCRIPTION OF THE DRAWINGS

The invention will be further described below with reference to the accompanying drawings, in which

FIGS. 4–6 illustrate various embodiments of penetrating elements forming part of the package of FIG. 1.

DETAILED DESCRIPTION OF PREFERRED EMBODIMENT

Figure 1:
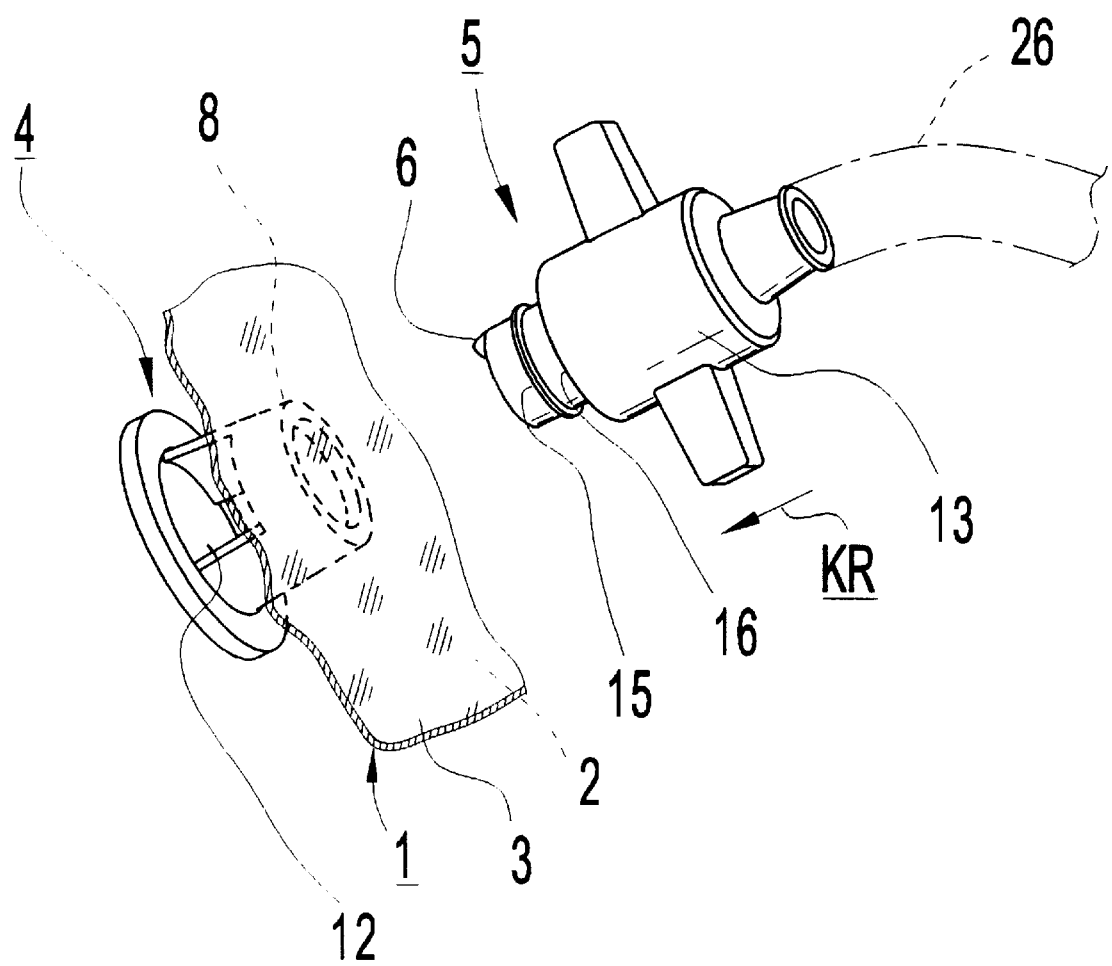
FIG. 1 is a perspective view of members of the package according to the invention.
Figure 2:
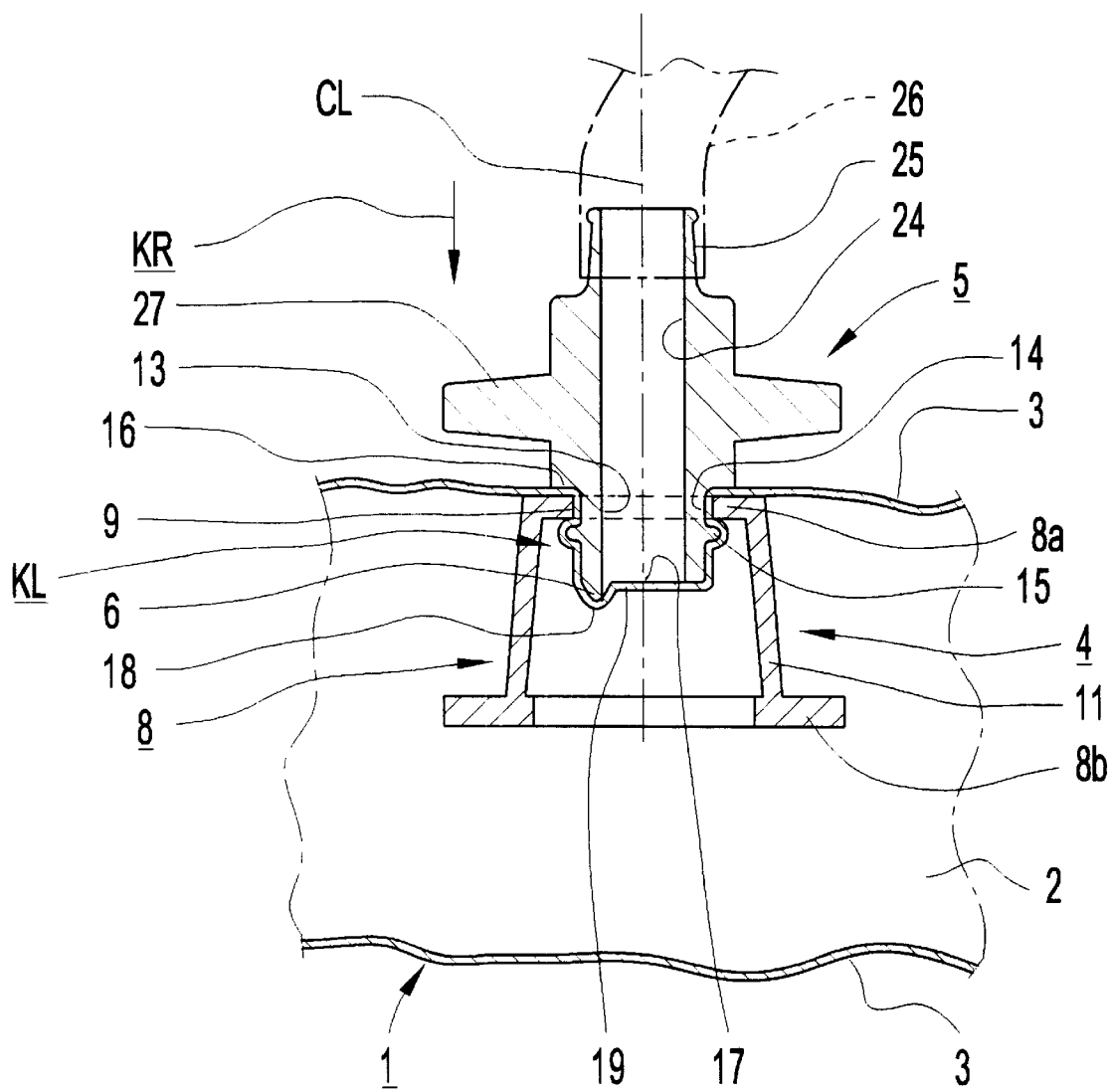
FIG. 2 is a section through the members of FIG. 1, whereby the package is unopened.
Figure 3:
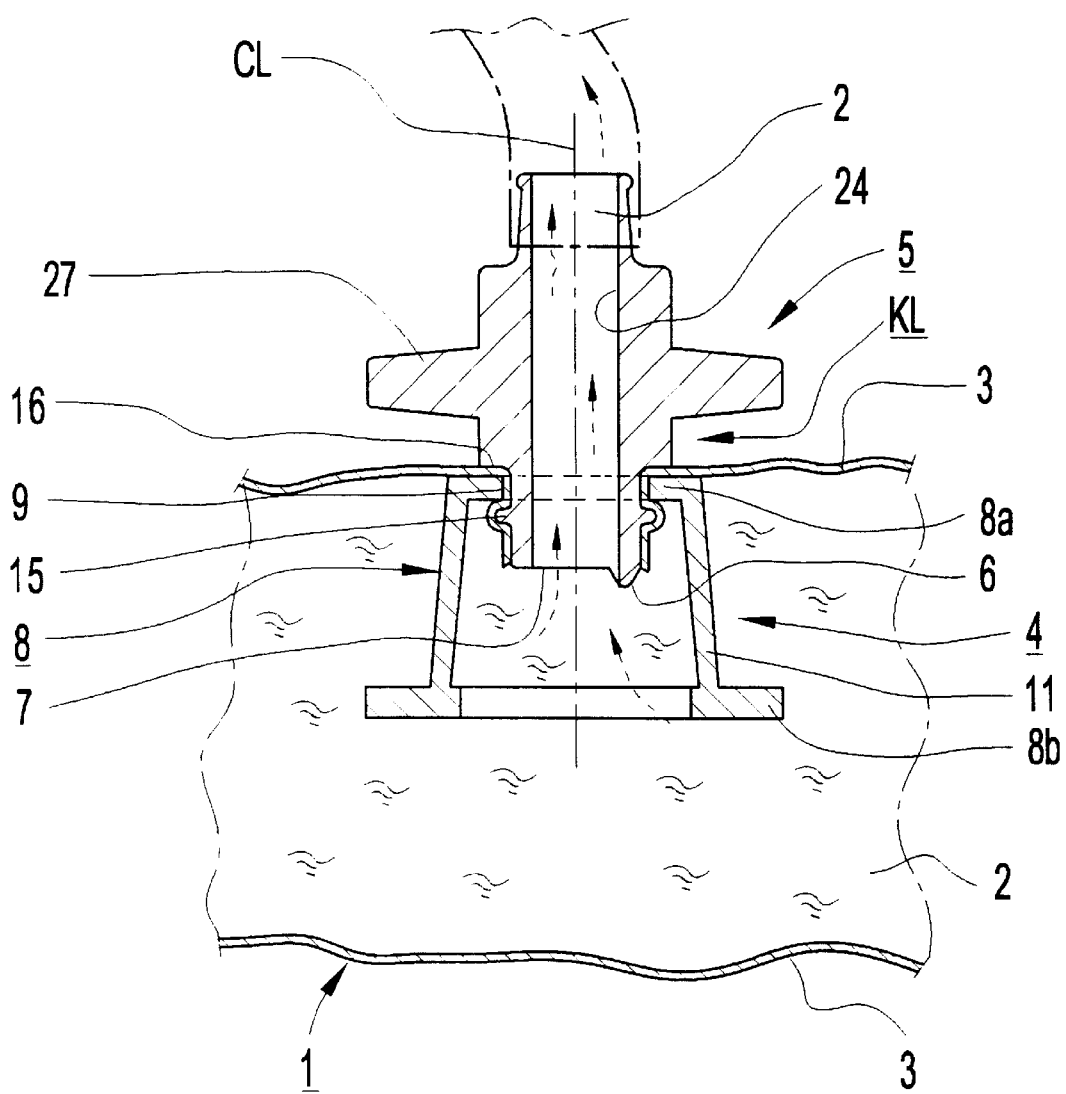
FIG. 3 is a section through the members of FIG. 1, whereby the package is opened.

In the drawings, there is shown a package 1 for liquid products 2, preferably foodstuff in liquid form such as beverages of low viscosity and more viscous foodstuff such as ketchup, mustard and sauces. The package 1 has flexible walls 3 of plastic material, i.e. it is of plastic bag type. Inside the package 1 there is provided an inner coupling device 4 to which an outer coupling device 5 can be connected through the flexible wall 3.

The outer coupling device 5 has a perforation means 6 for making a hole 7 in the flexible wall 3 so that the product 2 can be removed or discharged from the package 1 through the inner coupling device 4, said hole 7 and the outer coupling device 5.

The perforation means 6 is provided not to make the hole 7 in the flexible wall 3 when said inner and outer coupling devices 4, 5 are interconnected, but may be used for making said hole 7 during a perforating step after said interconnection.

The inner coupling device 4 may include an inner coupling member 8 in the form of a first annular member 8a with an opening 9. This first annular member 8a may be located at or next to the inner side of the flexible wall 3 and the inner coupling device 4 may also include a second annular member 8b and said annular members 8a, 8b may be connected to two or more connection members 11 with intermediate openings 12.

The outer coupling device 5 includes or consists of an outer coupling member 13 which may be inserted in a connecting direction KR into the opening 9 of the inner coupling member 8 while it simultaneously folds unopened portions 14 of the flexible wall 3 into the opening 9 without opening said portions. To accomplish this, the flexible wall 3 may have such elasticity that it can be extended or streched during said folding of the portions 14 into the opening 9 without thereby breaking.

The outer coupling member 13 has a preferably annular snap-in portion 15 which protrudes in radial direction relative to a center line CL which runs in axial direction through the outer coupling member 13. The outer coupling member 13 also includes a support portion 16 which also protrudes in said radial direction relative to the center line CL of the connecting direction KR.

The outer coupling member 13 is connected to the inner coupling member 8 by insertion thereof into the opening 9 while folding in said portions 14 of the flexible wall 3 until the snap-in portion 15 snaps past the first annular member 8a of the inner coupling member 8 and until the support portion 16 through portions of the flexible wall 3 is supported by the outer side of said first annular member 8a. Hereby, the snap-in portion 15 and support portion 16 prevent the outer coupling member 13 from moving in said axial direction relative to the inner coupling member 8, said portions however permitting said outer coupling member 13 to pivot or rotate about the center line CL relative to the inner coupling member 8.

The perforation means 6 protrudes outwards from a radially directed end edge 17 of the outer coupling member 13 in axial direction relative to said center line CL and is designed to shape the folded-in portions 14 of the flexible wall 3 to a pocket 18 during insertion of the outer coupling member 13 into the opening 9 without making a hole in said pocket 18. This pocket 18 protrudes axially relative to radially directed and along the radial end edge 17 extending portions 19 of the folded-in portions 14 of the flexible wall 3.

When the outer coupling member 13 is pivoted or rotated about the center line CL relative to the inner coupling member 8, either in one direction or the opposite direction, the perforating means 6 initially cuts up the side of said pocket 18 and then a hole 7 in the radially directed portions 19 of the flexible wall 3 adjacent the pocket 18.

In order to facilitate said perforation, the perforation means 6 may have at least one cutting edge 20 and/or 21 (see FIG. 4) and/or cutting point 22 and/or 23 (see FIG. 5), which,is/are directed towards the side of the pocket 18.

There may also be more than one perforating means 6 (see, FIG. 6) which may be located beside each other in a curve along peripheral portions of the end edge 17.

To accomplish discharge of the product, 2 from the package 1 when said hole 7 has been made, the outer coupling member 13 may have a through-flow passage 24 and a connecting portion 25 for a hose 26 so that said product 2 can be discharged from the package 1t through the hole 7 and the through-flow passage 24.

In order to facilitate retention and rotation of the outer coupling device 5 when it is connected to and rotated relative to the inner coupling device 4, the outer coupling device 5 may include one or more radially directed flanges 27.

The inner coupling device 4 may be fixedly attached to the inner side of the flexible wall 3 or be retained at said inner side of the flexible wall 3 by means of the outer coupling device 5. In said latter case, the coupling devices 4, 5 thus together define a clamp which clamps them to the flexible wall 3, whereby there is no need to attach the inner coupling device 4 to the flexible wall 3 by other means.

The invention is not limited to the embodiment described above, but may vary within the scope of the following claims. As alternatives which are not illustrated, it can be mentioned that the coupling members 8, 3 of the coupling devices 4, 5 can be designed in other ways as can the perforation means 6.

What is claimed is:

1. Method for manufacturing a package having a flexible wall and adapted for liquid products (2), preferably foodstuff in liquid form, whereby an inner coupling device (4) is provided within unopened portions (14) of the flexible wall (3), whereby the inner coupling device (4) and an outer coupling device (5) are connectable to each other, and whereby the outer coupling device (5) includes a perforation means (6) for penetrating said unopened portions (14) of the flexible wall (3) such that the liquid product (2) can be discharged from the package (1) through a hole (7) formed by said penetration, characterized by interconnecting the outer and inner coupling devices (5, 4) without penetrating the unopened portions (14) of the flexible wall (3) lying therebetween, and penetrating, after said interconnection of the outer and inner coupling devices (5, 4), said unopened portions (14) of the flexible wall (3) by means of the perforation means (6) of the outer coupling device (5).

2. Method according to claim 1, characterized by connecting the outer coupling device (5) to the inner coupling device (4) by moving said outer coupling device (5) in an axial connecting direction (KR) relative to said inner coupling device (4) and, after said connection, rotating the outer coupling device (5) relative to said inner coupling device (4) so that the perforation means (6) makes a hole (7) in the flexible wall (3).

3. Method according to claim 1, characterized by inserting the outer coupling device (5) in an axial connecting direction (KR) into and, through folded-in portions (14) of the flexible wall (3), snapping it onto the inner coupling device (4) such that the outer coupling device can be rotated relative to the inner coupling device (4).

* * * * *